United States Patent
Harada et al.

(10) Patent No.: US 8,512,157 B2
(45) Date of Patent: Aug. 20, 2013

(54) VEHICLE HUB UNIT

(75) Inventors: Katsuyuki Harada, Yamatokoriyama (JP); Kentaro Shirakami, Osaka (JP); Naoto Araki, Yao (JP)

(73) Assignee: JTEKT Corporation, Osaka-Shi (JP)

( * ) Notice: Subject to any disclaimer, the term of this patent is extended or adjusted under 35 U.S.C. 154(b) by 0 days.

(21) Appl. No.: 13/207,021

(22) Filed: Aug. 10, 2011

(65) Prior Publication Data

US 2012/0049611 A1  Mar. 1, 2012

(30) Foreign Application Priority Data

Aug. 30, 2010  (JP) ................................. 2010-192540

(51) Int. Cl.
*F16D 1/06*  (2006.01)

(52) U.S. Cl.
USPC .......................................... 464/178; 464/182

(58) Field of Classification Search
USPC ...... 464/178, 182; 384/544, 589; 403/359.6, 403/94, 96, 97
See application file for complete search history.

(56) References Cited

U.S. PATENT DOCUMENTS

| | | | | |
|---|---|---|---|---|
| 4,440,256 A | * | 4/1984 | Palmer | 384/544 X |
| 4,460,058 A | * | 7/1984 | Welschof et al. | 464/182 X |
| 8,066,337 B2 | * | 11/2011 | Tsuzaki et al. | 464/178 X |
| 8,100,775 B2 | * | 1/2012 | Hirai et al. | 464/178 |
| 8,246,256 B2 | * | 8/2012 | Langer et al. | 384/544 |
| 2008/0175526 A1 | | 7/2008 | Langer et al. | |
| 2008/0193071 A1 | | 8/2008 | Langer et al. | |
| 2009/0097792 A1 | * | 4/2009 | Kamikawa et al. | |
| 2009/0108668 A1 | * | 4/2009 | Kamikawa et al. | |

FOREIGN PATENT DOCUMENTS

| | | |
|---|---|---|
| EP | 2 045 100 A2 | 4/2009 |
| EP | 2 103 451 A1 | 9/2009 |
| JP | A-2008-174178 | 7/2008 |
| JP | A-2008-536737 | 9/2008 |
| WO | WO 2006/114083 A1 | 11/2006 |
| WO | WO 2011147435 A1 * | 12/2011 |

OTHER PUBLICATIONS

Dec. 28, 2011 Extended Search Report issued in European Patent Application No. 11178405.4.

* cited by examiner

*Primary Examiner* — Gregory Binda
*Assistant Examiner* — Matthieu Setliff
(74) *Attorney, Agent, or Firm* — Oliff & Berridge, PLC

(57) ABSTRACT

A vehicle hub unit includes: an outer ring; rolling elements; a hub wheel that is arranged radially inward of the outer ring via the rolling elements; and an inner ring member that is fixed to an end portion of a hub spindle of the hub wheel by clinching. A spline tooth portion that meshes with a tooth portion of a constant velocity joint that transmits driving force to the hub unit is formed at a clinched portion of the hub spindle. A protruding portion is formed at a radially inner side portion of a bottom of the spline tooth portion.

7 Claims, 6 Drawing Sheets

VEHICLE HUB UNIT

INCORPORATION BY REFERENCE

The disclosure of Japanese Patent Application No. 2010-192540 filed on Aug. 30, 2010, including the specification, drawings and abstract, is incorporated herein by reference in its entirety.

BACKGROUND OF THE INVENTION

1. Field of the Invention

The invention relates to a vehicle hub unit in which a member that constitutes an inner ring is fixed by clinching to an end portion of a hub spindle of a hub wheel to which a wheel is fitted.

2. Description of Related Art

A hub unit is used to support a wheel of an automobile such that the wheel is rotatable with respect to a suspension. FIG. 4 is a sectional view that illustrates an example of an existing hub unit.

A hub unit 51 shown in FIG. 4 includes a hub wheel 53, an inner ring member 54, an outer ring 55, and a plurality of rolling elements 56. The hub wheel 53 has a hub spindle 52. The inner ring member 54 is fixed to one end of the hub spindle 52 by clinching. The outer ring 55 is arranged radially outward of the hub spindle 52. The rolling elements 56 are rollably arranged between one of outer ring raceways 55a of the inner peripheral surface of the outer ring 55, and an inner ring raceway 52a of the outer peripheral surface of the hub spindle 52 or an inner ring raceway 54a of the outer peripheral surface of the inner ring member 54. A flange portion 57 is formed at an end portion (left end portion in FIG. 4) of the hub wheel 53, and a wheel of a tire, a brake disc, and the like (not shown), are fitted to the flange portion 57. A fixing flange 58 is formed on the outer peripheral surface of the outer ring 55. In addition, the fixing flange 58 is used to fit the hub unit 51 to a vehicle body-side member (not shown) supported by a suspension of a vehicle.

Rotational driving force of a drive shaft 60 is transmitted to the hub unit 51 via a constant velocity joint 59. As one method of transmitting the rotational driving force, there is known a method in which, as shown in FIG. 5 in detail, a spline tooth portion (side face spline) 62 is formed at a clinched portion 61 of the hub spindle end portion for fixing the inner ring member 54, and then the spline tooth portion 62 is meshed with a tooth portion (side face spline) 64 formed at an end surface of the outer ring 63 of the constant velocity joint 59 (see, for example, Published Japanese Translation of PCT Application No. 2008-536737 and Japanese Patent Application Publication No. 2008-174178).

In the hub units described in Published Japanese Translation of PCT Application No. 2008-536737 and Japanese Patent Application Publication No. 2008-174178, rotational driving force is transmitted to the hub unit via a constant velocity joint due to the mesh of the teeth that extend in a direction substantially perpendicular to a rotary shaft.

SUMMARY OF THE INVENTION

It is an object of the invention to provide a vehicle hub unit to which rotational driving force is transmitted via the above-described side face spline, and in which stiffness of a spline tooth portion formed at a clinched portion of a hub spindle end portion is increased to thereby make it possible to increase an allowable loading torque for the hub unit.

An aspect of the invention relates to a vehicle hub unit including: an outer ring; rolling elements; a hub wheel that is arranged radially inward of the outer ring via the rolling elements; and an inner ring member that is fixed to an end portion of a hub spindle of the hub wheel by clinching. A spline tooth portion that meshes with a tooth portion of a constant velocity joint that transmits driving force to the hub unit is formed at a clinched portion of the hub spindle. A protruding portion is formed at a radially inner side portion of a bottom of the spline tooth portion.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
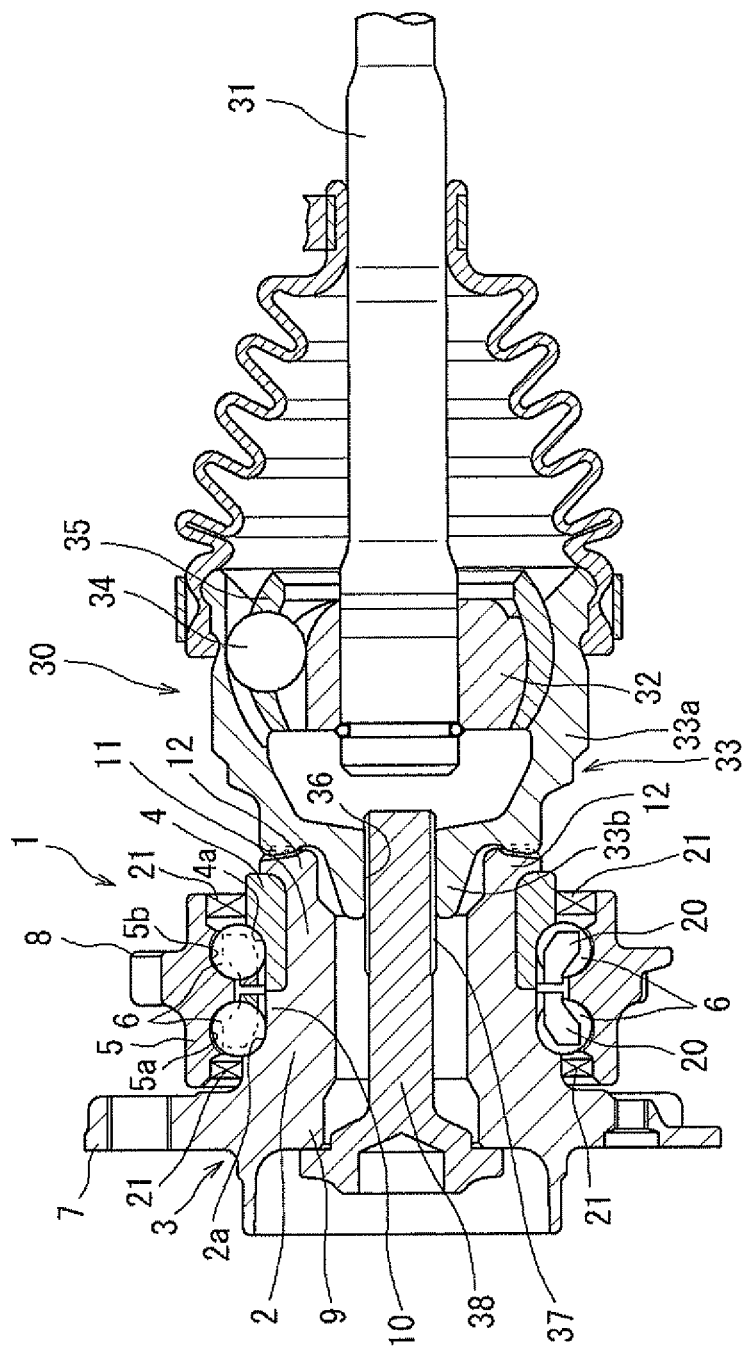
FIG. 1 is a sectional view that illustrates a vehicle hub unit according to an embodiment of the invention.
Figure 2:
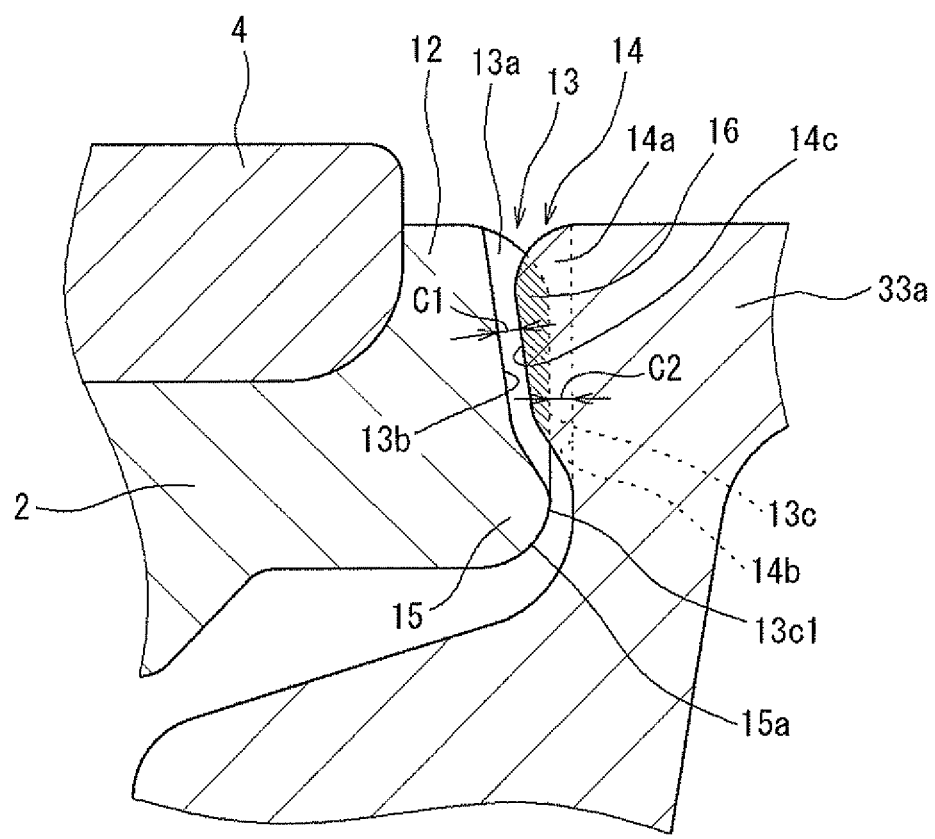
FIG. 2 is an enlarged view that illustrates an end portion of a clinched portion of the vehicle hub unit shown in FIG. 1.

Hereinafter, a vehicle hub unit according to an embodiment of the invention will be described in detail with reference to the accompanying drawings. FIG. 1 is a sectional view that illustrates a vehicle hub unit 1 according to the embodiment of the invention. FIG. 2 is an enlarged view that illustrates an end portion of a clinched portion of the vehicle hub unit shown in FIG. 1.

The vehicle hub unit 1 supports a wheel of an automobile such that the wheel is rotatable with respect to a suspension. The vehicle hub unit 1 includes a hub wheel 3, an inner ring member 4, an outer ring 5 and a plurality of rolling elements 6. The hub wheel 3 has a cylindrical hub spindle 2. The inner ring member 4 is fixed to one end (right end portion in FIG. 1) of the hub spindle 2 by clinching. The outer ring 5 is arranged radially outward of the hub spindle 2. The rolling elements 6 each are rollably arranged between an outer ring raceway 5a of the inner peripheral surface of the outer ring 5 and an inner ring raceway 2a of the outer peripheral surface of the hub spindle 2 or between an outer ring raceway 5b of the inner peripheral surface of the outer ring 5 and an inner ring raceway 4a of the outer peripheral surface of an inner ring member 4. The rolling elements 6 are retained by a cage 20, and arranged at predetermined intervals in the circumferential direction. Seal members 21 are provided in an annular space formed between the outer ring 5 and the hub wheel 3. The seal members 21 close the annular space from both ends of the annular space in the axial direction.

A flange portion 7 is formed at the end portion (left end portion in FIG. 1) of the hub wheel 3. A wheel of a tire, a brake disc, and the like (not shown), are fitted to the flange portion 7 with bolts. A fixing flange 8 is formed on the outer peripheral surface of the outer ring 5. The fixing flange 8 is used to fit the hub unit 1 to a vehicle body-side member (not shown) supported by the suspension of a vehicle.

The hub spindle 2 is a single-piece member that has a large-diameter portion 9 and a small-diameter portion 11. The large-diameter portion 9 is formed at a position near the flange portion 7. The small-diameter portion 11 is smaller in diameter than the large-diameter portion 9, and is formed so as to be contiguous with the large-diameter portion 9 via a step 10. The inner ring raceway 2a is formed in the outer peripheral surface of the large-diameter portion 9. The inner ring raceway 2a corresponds to the outer ring raceway 5a of the outer ring 5.

The inner ring member 4 is fitted onto the outer peripheral surface of the small-diameter portion 11 of the hub spindle 2, and then an end portion of the small-diameter portion 11 is clinched to form a clinched portion 12. In this way, the inner ring member 4 is fixed between the step 10 and the clinched portion 12.

Driving force of a drive shaft 31 is transmitted to the hub unit 1 via a constant velocity joint 30. The constant velocity joint 30 according to the embodiment is a Birfield constant velocity joint. The constant velocity joint 30 includes an inner ring 32, a plurality of balls 34 and a cage 35. The inner ring 32 is joined to one end of the drive shaft 31. An outer ring 33 is arranged radially outward of the inner ring 32. The balls 34 are arranged between the inner ring 32 and the outer ring 33. The cage 35 retains the balls 34.

The outer ring 33 of the constant velocity joint 30 has a bowl-shaped outer ring cylindrical portion 33a and an outer ring shaft portion 33b. The outer ring shaft portion 33b extends from a center portion of an end surface of the outer ring cylindrical portion 33a. The outer ring shaft portion 33b has a hole 36 that extends in the axial direction. The inner peripheral surface of the outer ring shaft portion 33b, which defines the hole 36, has an internal thread. The hub unit 1 is connected to the constant velocity joint 30 by a cap bolt 38 that has an external thread 37 at its end portion.

As shown in FIG. 2, a spline tooth portion 13 is formed at the end surface of the clinched portion 12 of the end portion of the hub spindle 2. A tooth portion 14 is formed at the end surface of the outer ring cylindrical portion 33a, which faces the clinched portion 12. Owing to the mesh of the spline tooth portion 13 and the tooth portion 14, rotational driving force of the drive shaft 31 is transmitted to the hub unit 1 via the constant velocity joint 30.

The number of teeth 13a of the spline tooth portion 13 is 37, a protruding portion 15 is formed at each bottom 13b between the consecutive teeth 13a. Each protruding portion 15 protrudes toward the tooth portion 14 of the outer ring cylindrical portion 33a that faces the spline tooth portion 13. Each protruding portion 15 is formed at a radially inner portion of the bottom 13b of the spline tooth portion 13. More specifically, each protruding portion 15 is formed at the bottom 13b at a portion substantially radially inward of a meshing portion 16 (hatched portion in FIG. 2) at which the tooth 13a of the spline tooth portion 13 is in mesh with a tooth 14a of the tooth portion 14 of the outer ring cylindrical portion 33a. By forming the protruding portions 15, the stiffness of each of the teeth 13a that constitute the spline tooth portion 13 is increased. Thus, the allowable loading torque for the hub unit 1 is increased. For example, the experiment was conducted on the spline tooth portion having 37 teeth, and the maximum principal stress and the shear stress were respectively reduced by approximately 14% and approximately 24% in the case where the protruding portions 15 are formed as compared with the case where no protruding portions 15 are formed.

A predetermined clearance C1 is left between each bottom 13b of the spline tooth portion 13, including the surface of the protruding portion 15, and a top surface 14c of the tooth 14a of the tooth portion 14 of the outer ring cylindrical portion 33a, which faces the bottom 13b. On the other hand, a predetermined clearance C2 is left between a top surface 13e of each tooth 13a of the spline tooth portion 13 and a bottom 14b of the tooth portion 14 of the outer ring cylindrical portion 33a, which faces the top surface 13e.

Figure 3A:
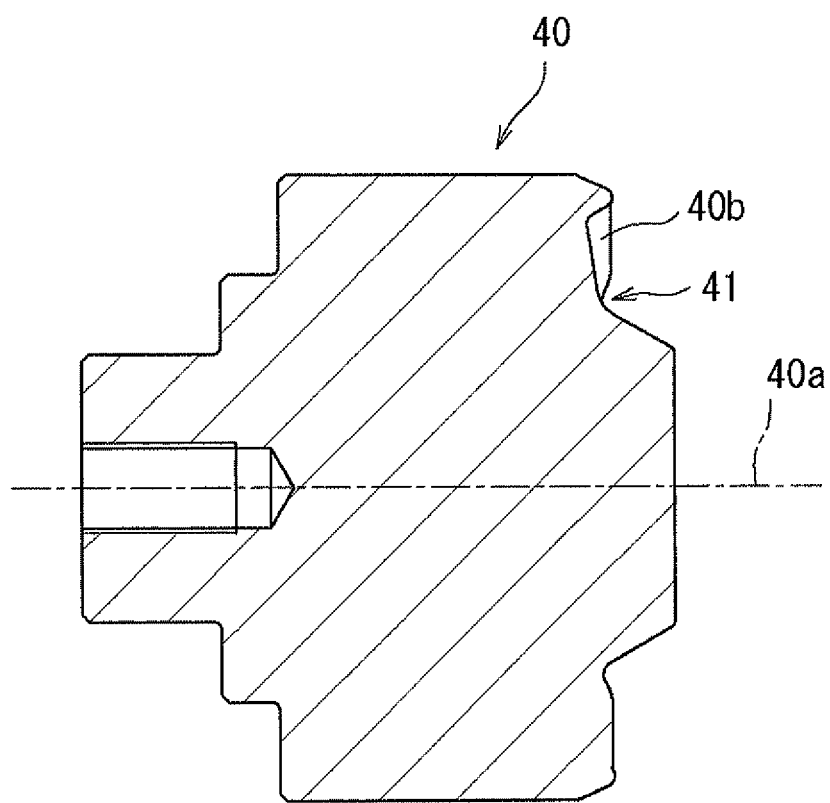
FIG. 3A and FIG. 3B are views that illustrate a die for clinching an end portion of a hub spindle and for forming a spline tooth portion at the end portion.
Figure 3B:
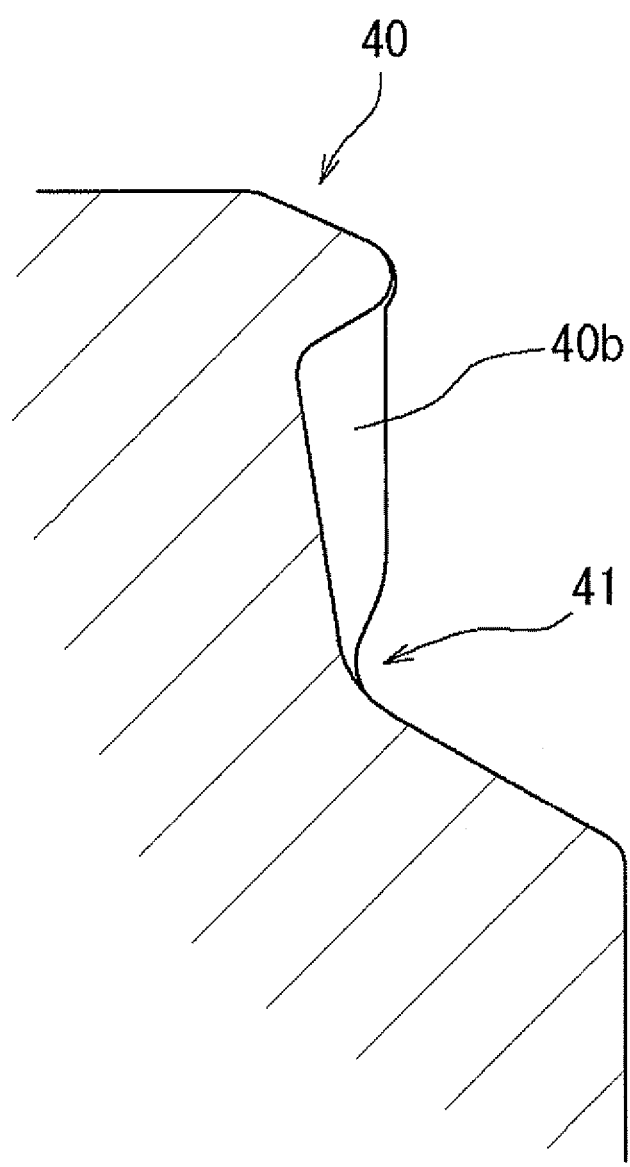

The spline tooth portion 13 is formed together with the clinched portion 12 at the same time by fitting the inner ring member 4 onto the outer peripheral surface of the small-diameter portion 11 of the hub spindle 2 and then subjecting the end portion of the small-diameter portion 11 to closed die forging. In the present embodiment, a die 40 shown in FIG. 3 is inserted into the opening of the hub wheel 3 at a portion to which the inner ring member 4 is fitted, and then the die 40 is oscillated at a predetermined inclination angle about an axis 40a to perform ordinary oscillating clinching. Through the oscillating clinching, the clinched portion 12 and the spline tooth portion 13 are formed. At this time, a recess 41 having a shape corresponding to each protruding portion 15 of the spline tooth portion 13 is formed radially inward of each protruding portion 40b of the die 40, the protruding portion 40b corresponding to the bottom of the spline tooth portion 13. During closed die forging, the recesses 41 are used to form the protruding portions 15 of the spline tooth portion 13.

The tooth portion 14 of the outer ring cylindrical portion 33a as well as the spline tooth portion 13 is formed by closed die forging. The predetermined clearances C1 and C2 are set such that tolerances in closed die forging are absorbed so as not to cause contact between the teeth when the constant velocity joint 30 is fitted to the hub unit 1. Although the clearances C1 and C2 vary depending on the accuracy of closed die forging, the clearances C1 and C2 are usually approximately 0.5 to 1 mm.

In addition, a top surface 13c1 which is near the radially inner end portion and which is a part of the strip-shaped top surface 13e of each tooth 13a of the spline tooth portion 13 is flush with a radially inner inclined surface 15a of the corresponding protruding portion 15. Thus, it is possible to reduce concentration of stress to thereby enhance the stiffness of the teeth.

Figure 4:
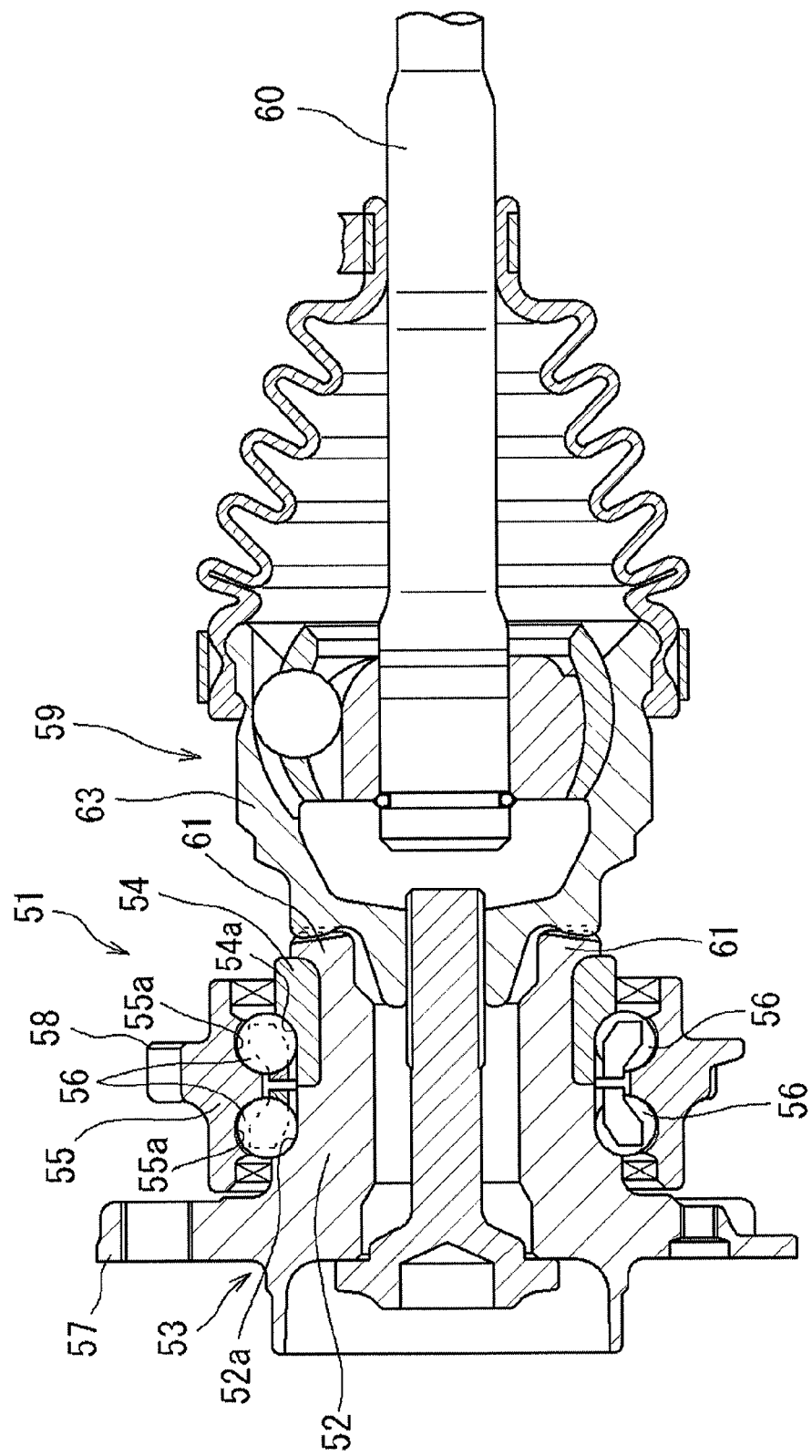
FIG. 4 is a sectional view that illustrates an example of an existing vehicle hub unit.
Figure 5:
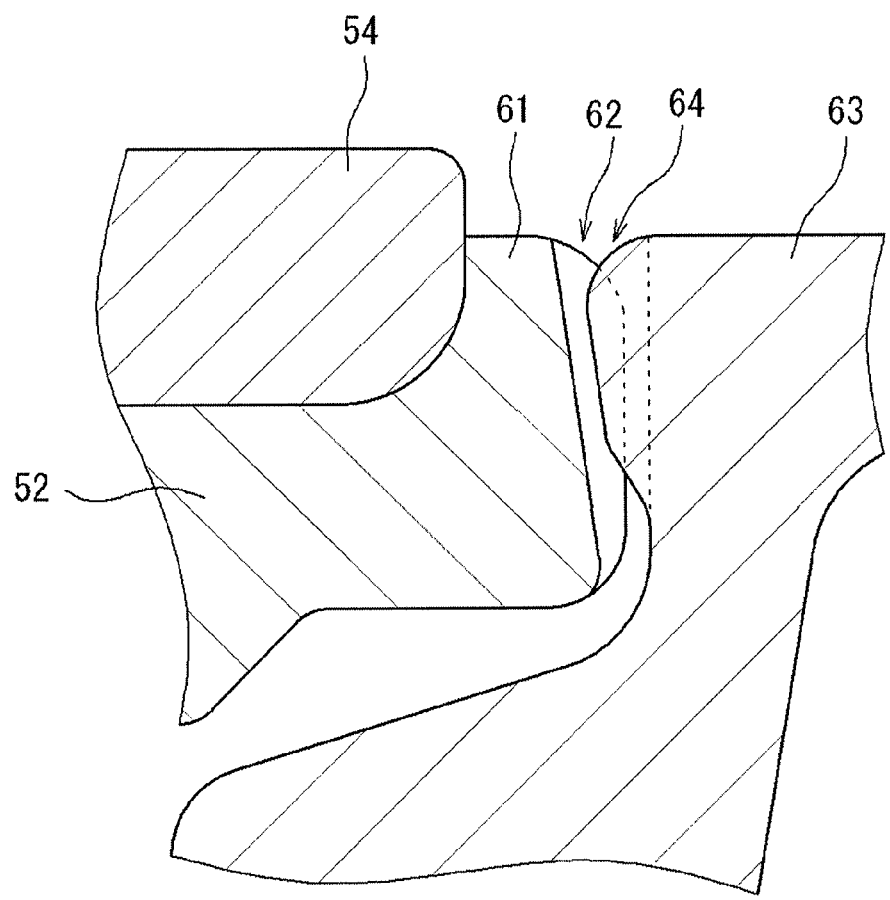
FIG. 5 is an enlarged view that illustrates an end portion of a clinched portion of the vehicle hub unit shown in FIG. 4.

In addition, in the present embodiment, it is possible to enhance the stiffness of the teeth by forming the protruding portion 15 at each bottom 13b of the spline tooth portion 13, and, in addition, it is possible to reduce stress loading on the die 40 by forming the protruding portions 15. That is, in the embodiment shown in FIG. 1 and FIG. 2, spline formation is minimized to reduce the area of the flat portion of each bottom as compared with the existing example shown in FIG. 4 and FIG. 5. Therefore, it is possible to reduce a load on the protruding portions 40b of the die 40 accordingly. Specifically, a die pressing force required to form the spline tooth portion 13 is decreased by approximately 20% to thereby make it possible to decrease stress loading on the die 40 (stress at the maximum stress portion) to a value at or below half of the stress loading on the die 40 in the existing art.

The invention is not limited to the above-described embodiment, and various modifications and changes may be made within the scope of the appended claims. For example, in the above described embodiment, a double row angular contact ball bearing is used as the bearing of the hub unit; instead, another bearing, such as a double row roller bearing, may be used.

In addition, in the above described embodiment, the number of teeth of the spline tooth portion is 37; instead, the number of teeth of the spline tooth portion may be other than 37 (for example, 31). In addition, in the above-described embodiment, the sectional shape of each protruding portion is a wavy shape. Alternatively, another sectional shape, such as a semi-circular shape and a trapezoidal shape, may be employed. In addition, in the above-described embodiment, there is employed a third-generation structure in which an inner ring raceway is directly formed in the outer periphery of the hub spindle. Alternatively, a first-generation or second-generation structure in which a pair of inner rings is press-fitted onto a hub spindle may be employed.

What is claimed is:

1. A vehicle hub unit comprising:
   an outer ring;
   rolling elements;
   a hub wheel that is arranged radially inward of the outer ring via the rolling elements;
   an inner ring member that is fixed to an end portion of a hub spindle of the hub wheel by clinching;
   a spline tooth portion formed at a clinched portion of the hub spindle;
   a meshing portion at which the spline tooth portion meshes with a tooth portion of a constant velocity joint that transmits driving force to the hub unit; and
   a protruding portion formed at a radially innermost portion of a bottom of the spline tooth portion, the bottom being adjacent to the meshing portion,
   wherein the protruding portion projects more than the bottom and is formed radially inward of the meshing portion.

2. The vehicle hub unit according to claim 1, wherein a height of the protruding portion is set to such a height that a predetermined clearance is left between the protruding portion and a top surface of a tooth of the tooth portion of the constant velocity joint.

3. The vehicle hub unit according to claim 2, wherein the predetermined clearance is 0.5 to 1 mm.

4. The vehicle hub unit according to claim 3, wherein a portion of the top surface of the tooth of the spline tooth portion, the portion being near a radially inner end portion, is flush with a radially inner inclined surface of the protruding portion.

5. The vehicle hub unit according to claim 2, wherein a portion of the top surface of the tooth of the spline tooth portion, the portion being near a radially inner end portion, is flush with a radially inner inclined surface of the protruding portion.

6. The vehicle hub unit according to claim 1, wherein a portion of the top surface of the tooth of the spline tooth portion, the portion being near a radially inner end portion, is flush with a radially inner inclined surface of the protruding portion.

7. The vehicle hub unit according to claim 1, wherein the protruding portion does not mesh with the tooth portion of the constant velocity joint.

* * * * *